United States Patent
Taneno et al.

(10) Patent No.: US 8,654,193 B2
(45) Date of Patent: Feb. 18, 2014

(54) METHOD FOR REGISTERING MODEL DATA FOR OPTICAL RECOGNITION PROCESSING AND OPTICAL SENSOR

(75) Inventors: Atsushi Taneno, Kyoto (JP); Shiro Fujieda, Kyoto (JP)

(73) Assignee: Omron Corporation, Kyoto (JP)

( * ) Notice: Subject to any disclaimer, the term of this patent is extended or adjusted under 35 U.S.C. 154(b) by 367 days.

(21) Appl. No.: 12/711,976

(22) Filed: Feb. 24, 2010

(65) Prior Publication Data
US 2010/0231711 A1 Sep. 16, 2010

(30) Foreign Application Priority Data
Mar. 13, 2009 (JP) ................. P2009-061355

(51) Int. Cl.
*H04N 7/18* (2006.01)
(52) U.S. Cl.
USPC ............... 348/135; 382/154; 703/2; 345/426
(58) Field of Classification Search
USPC ...................... 375/240.01–240.29
See application file for complete search history.

(56) References Cited

U.S. PATENT DOCUMENTS

| | | | |
|---|---|---|---|
| 5,864,632 A | 1/1999 | Ogawa et al. | |
| 6,278,798 B1 | 8/2001 | Rao | |
| 6,330,356 B1 | 12/2001 | Sundareswaran et al. | |
| 6,445,815 B1 | 9/2002 | Sato | |
| 6,480,627 B1 | 11/2002 | Mathias et al. | |
| 6,915,072 B2 | 7/2005 | Takahashi et al. | |
| 7,003,136 B1 | 2/2006 | Harville | |
| 7,167,583 B1 | 1/2007 | Lipson et al. | |
| 7,231,081 B2 | 6/2007 | Snow et al. | |
| 7,277,599 B2 | 10/2007 | Eian et al. | |

(Continued)

FOREIGN PATENT DOCUMENTS

| | | |
|---|---|---|
| JP | 10-122819 | 5/1998 |
| JP | 10-160464 A | 6/1998 |

(Continued)

OTHER PUBLICATIONS

S. Rusinkiewic and M Levoy, "Efficient variant of the ICP algorithm", Proc. 3DIM 2001, 145-152, 2001.*

(Continued)

*Primary Examiner* — Sath V Perungavoor
*Assistant Examiner* — Dakshesh Parikh
(74) *Attorney, Agent, or Firm* — Foley & Lardner LLP

(57) ABSTRACT

To easily generate model data having high recognition accuracy and being consistent with measurement conditions and installation environment of each of optical sensors. Basic model representing a range in which a workpiece can be optically recognized is inputted, and pieces of processing of imaging and measuring the workpiece under the same condition as that in an actual measurement and matching feature data of the workpiece obtained from this measurement with the basic model are executed for a plurality of number of cycles. Then, in the basic model, information is set as unnecessary information where the information cannot be associated with the feature data of the workpiece in all of the pieces of matching processing, or where the number of times or ratio the information cannot be associated is more than a predetermined reference value, or where the information cannot be associated with the feature data in any one of the pieces of executed matching processing. Then, the unnecessary information is deleted from the basic model, and information after each deletion is identified as model data to be registered and is registered to the memory.

13 Claims, 11 Drawing Sheets

(56) References Cited

U.S. PATENT DOCUMENTS

| | | | |
|---|---|---|---|
| 7,526,121 | B2 | 4/2009 | Ban et al. |
| 8,126,260 | B2 | 2/2012 | Wallack et al. |
| 8,170,295 | B2 | 5/2012 | Fujii et al. |
| 8,295,588 | B2 | 10/2012 | Fujieda et al. |
| 2002/0187831 | A1 | 12/2002 | Arikawa et al. |
| 2003/0152276 | A1 | 8/2003 | Kondo et al. |
| 2004/0051783 | A1* | 3/2004 | Chellappa et al. ............ 348/46 |
| 2004/0153671 | A1 | 8/2004 | Schuyler et al. |
| 2004/0247174 | A1 | 12/2004 | Lyons et al. |
| 2005/0084149 | A1 | 4/2005 | Aizawa et al. |
| 2005/0111703 | A1 | 5/2005 | Merbach et al. |
| 2005/0249400 | A1 | 11/2005 | Fukumoto |
| 2005/0249434 | A1* | 11/2005 | Xu et al. ............ 382/294 |
| 2005/0280645 | A1 | 12/2005 | Nagata et al. |
| 2005/0286767 | A1 | 12/2005 | Hager et al. |
| 2006/0050087 | A1 | 3/2006 | Tanimura et al. |
| 2006/0050952 | A1* | 3/2006 | Blais et al. ............ 382/154 |
| 2006/0182308 | A1 | 8/2006 | Gerlach et al. |
| 2006/0232583 | A1 | 10/2006 | Petrov et al. |
| 2007/0014467 | A1 | 1/2007 | Bryll |
| 2007/0081714 | A1 | 4/2007 | Wallack et al. |
| 2008/0025616 | A1 | 1/2008 | Bryll |
| 2008/0123937 | A1 | 5/2008 | Arias Estrada et al. |
| 2008/0212887 | A1 | 9/2008 | Gori et al. |
| 2008/0260227 | A1 | 10/2008 | Hayashi et al. |
| 2008/0303814 | A1 | 12/2008 | Ishiyama |
| 2009/0222768 | A1 | 9/2009 | Roe et al. |
| 2009/0309893 | A1 | 12/2009 | Boothroyd et al. |
| 2010/0231690 | A1 | 9/2010 | Fujieda et al. |
| 2010/0232647 | A1 | 9/2010 | Fujieda et al. |
| 2010/0232681 | A1 | 9/2010 | Fujieda et al. |
| 2010/0232682 | A1 | 9/2010 | Fujieda et al. |
| 2010/0232683 | A1 | 9/2010 | Fujieda et al. |
| 2010/0232684 | A1 | 9/2010 | Fujieda et al. |
| 2011/0090317 | A1 | 4/2011 | Su et al. |
| 2011/0150280 | A1* | 6/2011 | Tsuji ............ 382/103 |
| 2011/0218776 | A1 | 9/2011 | Shono et al. |
| 2012/0050525 | A1* | 3/2012 | Rinner et al. ............ 348/117 |
| 2012/0155786 | A1 | 6/2012 | Zargarpour et al. |

FOREIGN PATENT DOCUMENTS

| | | |
|---|---|---|
| JP | 10-269362 A | 10/1998 |
| JP | 2961264 | 8/1999 |
| JP | 2000-094374 A | 4/2000 |
| JP | 2005-017286 A | 1/2005 |
| JP | 2006-250889 A | 9/2006 |
| JP | 2007-064836 A | 3/2007 |
| JP | 2007-249592 | 9/2007 |

OTHER PUBLICATIONS

USPTO Notice of Allowance on U.S. Appl. No. 12/711,179 dated Jan. 27, 2012; 12 pages.

USPTO Office Action on U.S. Appl. No. 12/710,266 dated Feb. 23, 2012; 11 pages.

Zhengyou Zhang, A Flexible New Technique for Camera Calibration, Technical Report MSR-TR-98-71; Dec. 2, 1998, Microsoft Research, Microsoft Corporation, Redmond, WA 98052; pp. 1-21.

"Stereo Correspondence Using Segment Connectivity", Transactions of Information Processing Society of Japan, vol. 40, No. 8 (pp. 3219 to 3229), Aug. 1999.

U.S. Appl. No. 13/633,536, filed Oct. 2, 2012, Shiro, et al.

Paglieroni, David W.; Short Communication—A Unified Distance Transform Algorithm and Architecture; Machine Vision and Applications (1992) 5:47-55.

US Non-final Office Action on U.S. Appl. No. 12/711,814 dated Nov. 21, 2012; 16 pages.

USPTO Non-final Office Action on U.S. Appl. No. 12/710,266 mailed Oct. 24, 2012; 13 pages.

Japan Patent Office Notice of Grounds of Rejection mailed Dec. 11, 2012; pp. 1-2; with English translation.

Sumi, Yasushi, et al.; Three-Dimensional Object Recognition Using Stereo Vision; May 1997; pp. 1105-1112; Transactions of the Institute of Electronics, Information and Communication Engineers, Japan, vol. J80-D-II, No. 5.

USPTO Final Office Action on U.S. Appl. No. 12/710,266 mailed Jan. 29, 2013; 12 pages.

USPTO Non-final Office Action on U.S. Appl. No. 12/712,015 mailed Jan. 29, 2013; 16 pages.

Camera Calibration: Calibrating methods for stereo cameras; Sentience: A 3D volumetric perception system for mobile robots; Aug. 20, 2009; retrieved Mar. 10, 2013; <<http://code.google.com/p/sentience/wiki/CameraCalibration>>; 6 pages.

Fiala, et al.; Fully Automatic Camera Calibration Using Self-identifying Calibration Targets; Nov. 2005; National Research Council, Canada.

Japan Patent Office action on application 2009-059919 mailed Mar. 12, 2013; pp. 1-3; with partial English translation.

Japan Patent Office action on application 2009-059921 mailed Mar. 12, 2013; pp. 1-3; with partial English translation.

USPTO Notice of Allowance on U.S. Appl. No. 12/711,814 mailed Mar. 14, 2013; 12 pages.

USPTO Final Office Action on U.S. Appl. No. 12/710,266 dated Jul. 16, 2012; 16 pages.

USPTO Notice of Allowance on U.S. Appl. No. 12/711,028 dated Jun. 22, 2012; 11 pages.

USPTO Notice of Allowance on U.S. Appl. No. 12/711,196 dated Jun. 13, 2012; 11 pages.

USPTO Final Office Action on U.S. Appl. No. 12/711,018 dated Sep. 18, 2012; 13 pages.

USPTO action on U.S. Appl. No. 12/711,018 mailed Dec. 31, 2012; 13 pages.

1 USPTO Final Office Action on U.S. Appl. No. 12/711,018 mailed Apr. 15, 2013; 17 pages.

USPTO Corrected Notice of Allowability on U.S. Appl. No. 13/633,536 mailed Jul. 17, 2013; 3 pages.

USPTO Notice of Allowance on U.S. Appl. No. 12/711,018 mailed Aug. 20, 2013; 10 pages.

USPTO Notice of Allowance on U.S. Appl. No. 13/633,536 mailed Jun. 14, 2013; 20 pages.

USPTO Non-final Action on U.S. Appl. No. 12/711,018 dated Jun. 4, 2012; 14 pages.

USPTO Non-final Action on U.S. Appl. No. 12/711,028 dated Mar. 16, 2012; 12 pages.

USPTO Notice of Allowance on U.S. Appl. No. 12/711,179 dated Mar. 15, 2012; 6 pages.

\* cited by examiner

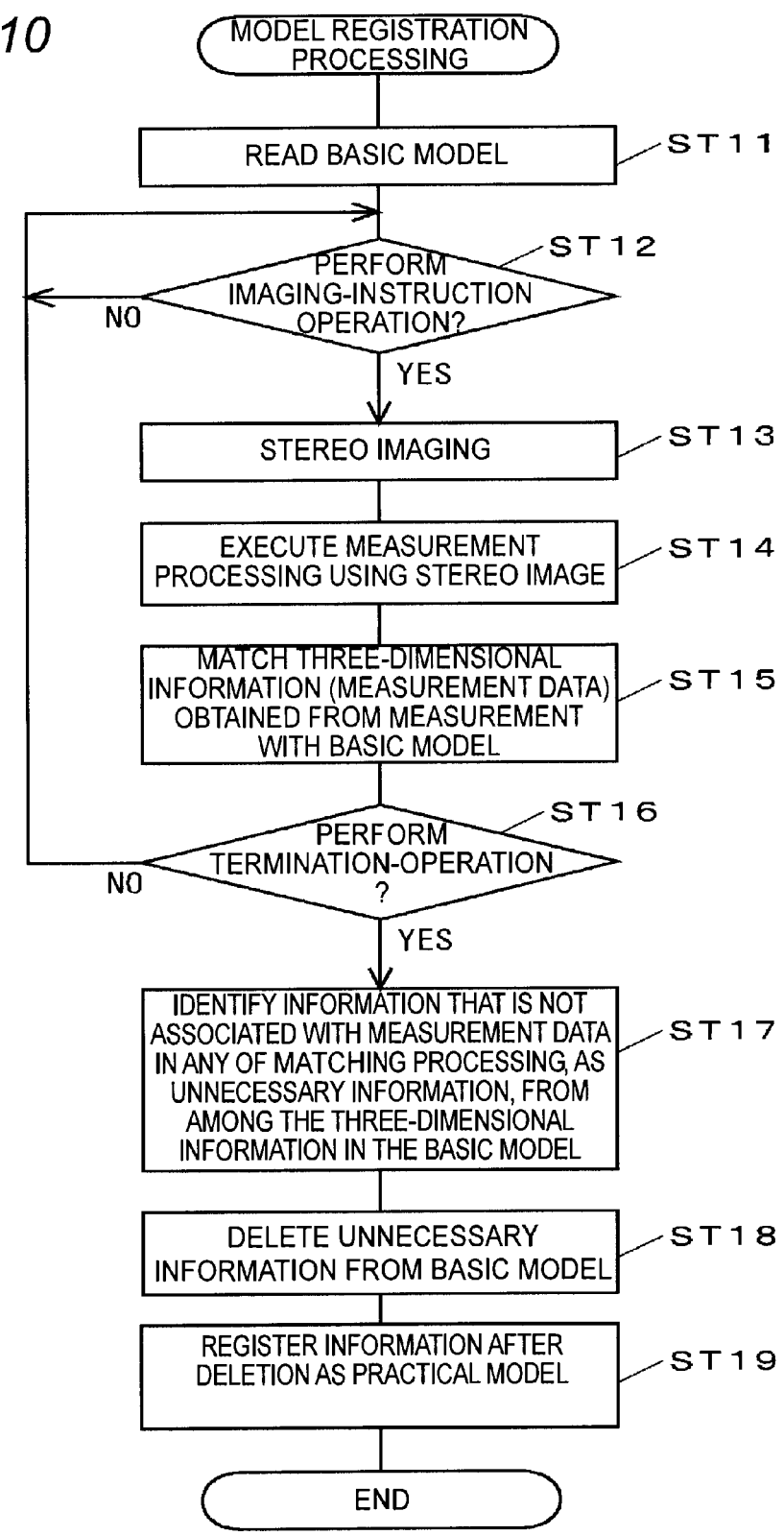

BASIC MODEL

PRACTICAL MODEL IN WORKPIECE ON WHICH SHADOW IS CAST

PRACTICAL MODEL IN WORKPIECE ON WHICH SHADOW IS NOT CAST

METHOD FOR REGISTERING MODEL DATA FOR OPTICAL RECOGNITION PROCESSING AND OPTICAL SENSOR

This application is based on Japanese Patent Application No. 2009-061355 filed with the Japan Patent Office on Mar. 13, 2009, the entire content of which is hereby incorporated by reference.

BACKGROUND OF THE INVENTION

1. Technical Field

The present invention relates to an optical sensor that executes predetermined recognition processing by imaging an object to be recognized with a camera, executing two-dimensional or three-dimensional measurement processing using the generated image, and matching the obtained feature data with previously registered model data. More particularly, the present invention relates to processing for registering the model data used in the above recognition processing to the optical sensor.

2. Related Art

For example, Japanese Patent No. 2961264 discloses a method for generating three-dimensional model data of an outline of an object.

In the invention of this Japanese Patent No. 2961264, three-dimensional information is assumed to be reconstructed by stereoscopic measurement, and an actual model of an object is measured multiple times while the measuring direction is changed in each of the measurement operations. Then, the three-dimensional information reconstructed by each of the measurement operations is matched with each other and is positioned, so that model data that can be measured in various directions are generated by combining the positioned information.

Japanese Patent No. 2961264 and "Stereo Correspondence Using Segment Connectivity", Transactions of Information Processing Society of Japan, Vol. 40, No. 8, pages 3219 to 3229, published on August 1999, disclose "segment-based stereo" as a method for reconstructing three-dimensional information of the outline of an object. In this method, edges included in images constituting a stereoscopic image are divided into segments of lines and curved lines based on connection points and branching points, and stereo-supported search is performed in units of segments, so that a predetermined number of three-dimensional coordinates are calculated.

A process for registering model data to an optical sensor generally includes the steps of providing a recognition-target object having a shape preferable for the registration-target optical sensor, actually executing imaging and measurement, and generating model data based on feature data obtained from measurement. In addition, experimental recognition is performed using the generated model data in order to ensure adequate accuracy in recognition, and the model data are corrected based on the recognition result. If the accuracy is extremely poor, for example, model data are generated all over again as necessary. As a result, it takes much labor and time to determine model data to be registered.

As described above, operation for registering models to an optical sensor is a heavy burden. Accordingly, engineers working at a site with a plurality of production lines executing the same step demand that model data registered to an optical sensor arranged on one of these lines can be exported to an optical sensor arranged on another line. However, in reality, illumination condition may be different depending on the line, there may be a line that is affected by external light, and uneven characteristics of cameras may result in generating images having different contrasts. Therefore, the state of an image generated by each optical sensor varies, which makes it difficult to register the same model data to each of the optical sensors.

On the other hand, in a case where model data are generated for each of the optical sensors, and model data are generated by different workers depending on the sensor, there may be a possibility that the contents set in the model data may vary depending on the worker, and the unevenness of the model data may result in unevenness in the stability of the processing carried out in each of the lines.

With regard to the above issues, the inventors have considered converting design data such as CAD data into a data format suitable for measurement to automatically generate model data that are not affected by the difference of measurement conditions and installation conditions of the sensors and importing the thus generated model data into each of the optical sensors. However, the model data derived from the design data include information beyond the measurable range of the optical sensors. As a result, when the measurement result is matched, the model data are found to include a large volume of information that is not associated with the measurement result, thus reducing the degree of consistency instead of increasing it.

SUMMARY

The present invention has been devised to solve the problems described above, and aims to easily generate model data having high recognition accuracy and being consistent with measurement conditions and installation environment of each of optical sensors.

A method for registering model data according to the present invention is carried out by an optical sensor that executes recognition processing of an object by imaging the object to be recognized with at least one camera, obtaining feature data representing a shape of the object by performing measurement processing using the generated image, and matching the obtained feature data with previously registered model data. In the method for registering model data, the following first to fourth steps are executed.

The first step includes inputting, with regard to the object to be recognized, basic model data representing a full-scale shape of the object in a range in which the object can be optically recognized.

The "range in which the object can be optically recognized" generally means the entire range of the surface of the object. However, if there is any section of the surface of the object that cannot be observed by the camera of any one of the optical sensors due to a reason that, e.g., there is a limitation on the attitude of the object during measurement, the section may be excluded from the "range in which the object can be optically recognized", so that it is not included in the basic model data. However, it is to be understood that the present invention does not exclude a possibility of inputting basic model data including information about sections that cannot be optically recognized, such as the internal structure of the object.

"Three-dimensional information representing a full-scale shape" may be constituted by information representing the outline shape or may be constituted by a set of coordinates representing the surface of the object. In addition, the "three-dimensional information representing a full-scale shape" is not limited to a full-scale representation, and includes a representation in a size reduced from the full-scale size by a predetermined ratio.

The second step includes performing, for the predetermined number of cycles, the pieces of processing of: measuring processing and imaging processing performed with the camera on an actual model of the object to be recognized; and processing for matching feature data of the actual model obtained by the measurement processing with the basic model data or data converted from the basic model data (hereinafter referred to as "converted model data"). The third step includes deleting data that could not be associated with the feature data of the actual model from the data matched with the feature data of the actual model in the second step (which means the basic model data or the converted model data that are processed in the second step), and adopting the remaining data as model data to be registered.

According to the above method, the basic model data about the recognized object that includes information more than what is needed by the apparatus is inputted, and this basic model data or the converted model data generated from the basic model data are matched with the measurement result of the measurement performed by the apparatus on the actual model. Then, the data that are not associated with the feature data of the actual model are deleted, as being data unnecessary for the processing in the apparatus, from the basic model data or the converted model data that have been subjected to the matching processing.

In the above matching processing, it is preferable that the positional relationship between the camera and the actual model is set to be the relationship expected during the actual measurement, and the image is generated according to the characteristics of the camera and the environment in which the optical sensor is installed. Further, it is preferable to match the feature data obtained from that image with the basic model data or the converted data thereof. Therefore, when the data that are not associated in the matching processing are deleted, the remaining data automatically become suitable for the recognition processing that should be performed by the optical sensor. Consequently, it is possible to eliminate or greatly reduce the operation for verifying the accuracy of the model data. Further, it is no longer necessary for the worker to correct the model data, and therefore, unevenness does not occur in the accuracy of the model data.

Further, since the basic model data is the information representing the full-scale shape of the object within the range in which the object to be recognized can be optically recognized, the same basic model data can be imported into all of the optical sensors that recognize the same object, and each of the optical sensors can execute the above method. Therefore, when the basic model data having a sufficient degree of accuracy are prepared, each of the optical sensors can make this basic model data into model data that is suitable for the recognition processing performed by the apparatus, and can register the model data thus generated.

Regarding the processing of the third step, three types of aspects will be hereinafter described.

In the third step according to the first aspect, the data that could not be associated with the feature data of the actual model in the matching processing in all of the cycles executed in the second step are determined to be deleted from among the data matched with the feature data of the actual model.

According to the above aspect, the data corresponding to the feature data that are hardly measured by the optical sensor carrying out this method are determined to be unnecessary information, and the basic model data or the converted model data from which the unnecessary information is removed can be registered as the model data. Therefore, the data corresponding to the model data can be stably extracted from the feature data obtained by measurement, and the recognition accuracy can be ensured.

In the third step according to the second aspect, the data that could not be associated with the feature data of the actual model in the matching processing in the second step for the number of times or ratio equal to or more than a predetermined reference value are determined to be deleted from among the data matched with the feature data of the actual model.

According to the above aspect, the model data do not include the information which can be measured by the optical sensor but of which measurement may become unstable due to variation of illumination condition and the like. Therefore, matching processing performed with unstable information can be prevented, and the recognition accuracy can be improved.

In the third step according to the third aspect, information that could not be associated with the feature data of the actual model in any one of the pieces of matching processing executed in the second step is determined to be deleted from among the data matched with the feature data of the actual model.

According to the above aspect, information that fails to be associated with the feature data of the actual model for at least once is deleted, as being unnecessary information, from the basic model data or the converted model data. Therefore, regarding the object to be recognized, the model data including only the information that can be measured almost without fail can be generated. Thus, the stability in recognition processing can be further improved.

In the above method, in a case where three-dimensional measurement processing is executed as the measurement processing so as to obtain feature data representing a three-dimensional shape of an object to be recognized, the first step includes inputting, as basic model data, three-dimensional information representing at least a full-scale shape of the object within a range in which the object can be optically recognized. The matching processing of the second step includes matching the feature data obtained from the actual model with the three-dimensional information represented by the basic model data.

On the other hand, in the measurement processing, two-dimensional measurement processing may be executed to obtain an edge of an object in an image generated by the camera. In this case, in the first step, two-dimensional information representing a full-scale edge pattern appearing in an image that is obtained by imaging the object arranged in a particular attitude with the camera is inputted as the basic model data. In the matching processing in the second step, the edge pattern obtained from the image of the actual model is matched with an edge pattern represented by the basic model data.

As described above, the method of the present invention can be applied to both of the apparatus for two-dimensional measurement and the apparatus for three-dimensional measurement.

The optical sensor applied with the above method includes an input unit for inputting, with regard to the object to be recognized, basic model data representing a full-scale shape of the object in an optically-recognizable range, an actual model processing unit that performs, for the predetermined number of cycles, the measuring processing and the imaging processing performed with the camera under the condition that an actual model of the object to be recognized is subjected to the processing and processing for matching feature data of the actual model obtained by the measurement processing with the basic model data inputted from the input unit or data converted from the basic model data, and a model data setting unit for deleting data that could not be associated with the feature data of the actual model from the data matched with the feature data of the actual model in the matching processing executed by the actual model processing unit, and adopting the remaining data as model data to be registered.

According to the above configuration, information is previously generated that represents, with a high degree of accuracy, the full-scale shape of the recognized object within a range in which the object can be optically recognized. This information is inputted as the basic model data to the optical sensor. The actual model arranged according to the measurement condition is introduced to the visual field of the camera. The pieces of processing performed by the model processing unit and the model setting unit are executed sequentially. Therefore, model data can be generated that are suitable for the measurement condition and the environment in which the optical sensors are installed, and the generated model data can be registered.

According to the present invention, for the plurality of optical sensors for recognizing the object of the same kind, one piece of basic model data is prepared, wherein the one piece of basic model data represents the full-scale shape of the object recognized by these sensors within the range in which the object can be optically recognized. This basic model data can be inputted to each of the optical sensors. The basic model data can be converted into model data suitable for the measurement condition, the characteristics of the camera, and the installation environment of each of the optical sensors, and the converted model data can be registered. Therefore, the registration processing of the model data can be efficiently carried out by each of the optical sensors.

Further, the actual model of the object to be recognized is imaged and measured under the same condition as that in the actual processing, and the model data are generated according to the information associated with this measurement result. Therefore, the accuracy of the model data can naturally ensured, and stable recognition processing can be executed with the model data.

BRIEF DESCRIPTION OF THE DRAWINGS

FIG. 10 is a flowchart showing a procedure of model registration processing;

DETAILED DESCRIPTION

Figure 1:
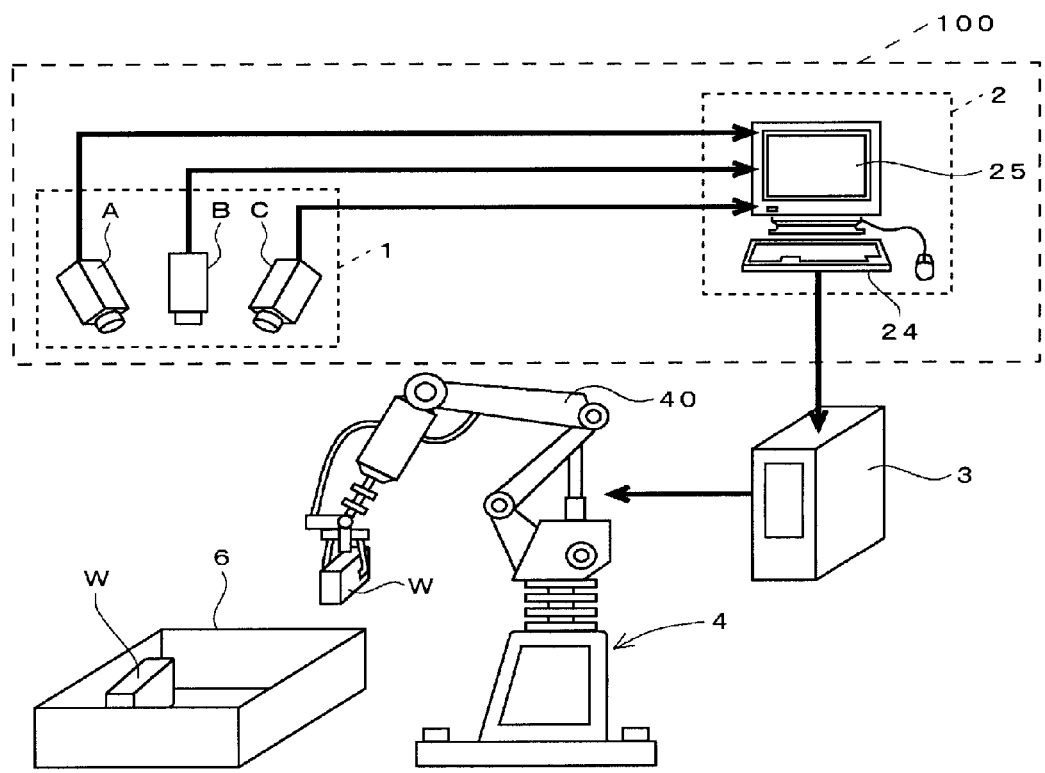
FIG. 1 is a view showing a configuration example of a picking system.

FIG. 1 shows an example of configuration of a picking system including a three-dimensional optical sensor.

This picking system picks up, one by one, workpieces W contained in a container box 6 in a factory, and conveys the workpieces W to a predetermined position. The picking system includes a joint-arm robot 4 that performs operation, a robot control apparatus 3 for controlling the operation of this robot 4, and a three-dimensional optical sensor 100 for recognizing the workpieces W to be processed.

A three-dimensional optical sensor 100 includes a stereo camera 1 and a recognition processing apparatus 2. The stereo camera 1 includes three cameras A, B, C arranged side by side. The recognition processing apparatus 2 stores a dedicated program, and is constituted by a personal computer connected to a display unit 25 and an input unit 24 such as a keyboard and a mouse.

The recognition processing apparatus 2 obtains three-dimensional information of an outline of a workpiece W by carrying out stereo measurement processing using the cameras A, B, C. Thereafter, the recognition processing apparatus 2 recognizes the position and the attitude of the workpiece W by matching the obtained three-dimensional information with three-dimensional model data previously registered (hereinafter referred to as a "three-dimensional model"). The robot control apparatus 3 receives the above recognition result transmitted from the recognition processing apparatus 2, and controls the operation of the robot 4 based on the received recognition result so that an arm 40 of the robot 4 grips the workpiece W.

Figure 2:
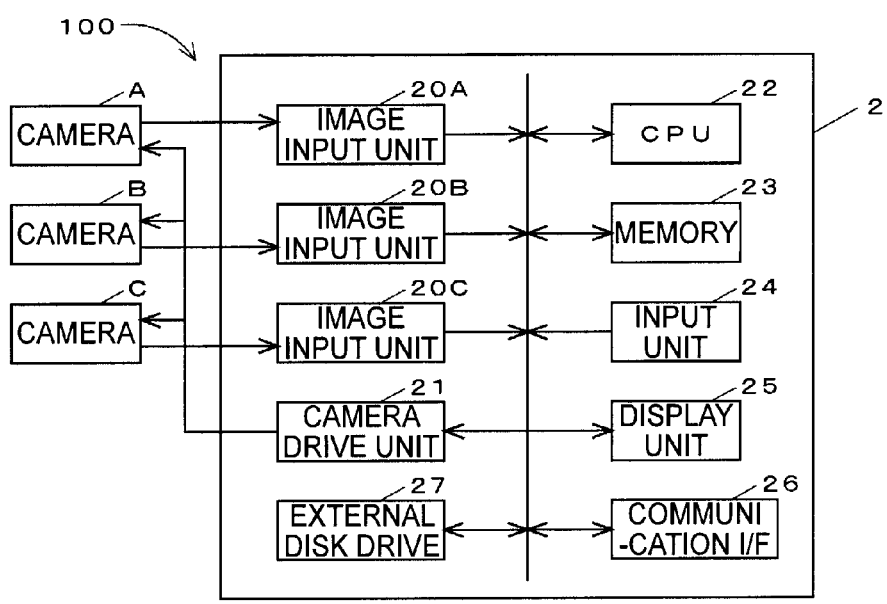
FIG. 2 is a block diagram showing an electric configuration of an optical sensor.

FIG. 2 is a block diagram showing the configuration of the above-described three-dimensional optical sensor 100.

As shown in the figure, the recognition processing apparatus 2 includes, e.g., image input units 20A, 20B, 20C respectively corresponding to the cameras A, B, C, a camera drive unit 21, a CPU 22, a memory 23, an input unit 24, a display unit 25, a communication interface 26, and an external disk apparatus 27.

The camera drive unit 21 simultaneously drives the cameras A, B, C according to the instructions given by the CPU 22. When calibration processing and processing for registering a three-dimensional model are performed, the cameras are driven upon an imaging-start instruction given by the input unit 24.

During calibration processing and three-dimensional model generation processing, the display unit 25 and the input unit 24 are used to input information for setting and give an imaging-start instruction, and are used to display information for supporting operation and allow the user to confirm a projected image of generated three-dimensional model.

The communication interface 26 is used to communicate with the robot control apparatus 3. The external disk drive 27 is used to read information from and write information to a storage medium such as a compact disk. In this embodiment, the external disk drive 27 is used to read later-described basic model data.

The memory 23 includes a large capacity memory such as a ROM, a RAM, and a hard disk, and stores programs and setting data for calibration processing, three-dimensional model generation processing, and three-dimensional recognition processing of the workpiece W. In addition, a dedicated area of the memory 23 stores three-dimensional model data and parameters for three-dimensional measurement calculated by the calibration processing.

The CPU 22 executes the calibration processing based on the programs in the memory 23, and calculates and registers the parameters for three-dimensional measurement. Thereafter, the CPU 22 generates model data for recognition processing and executes registration processing. Upon executing two kinds of setting processing, the optical sensor 100 is ready to execute three-dimensional measurement of the workpiece W and recognition processing.

Figure 3:
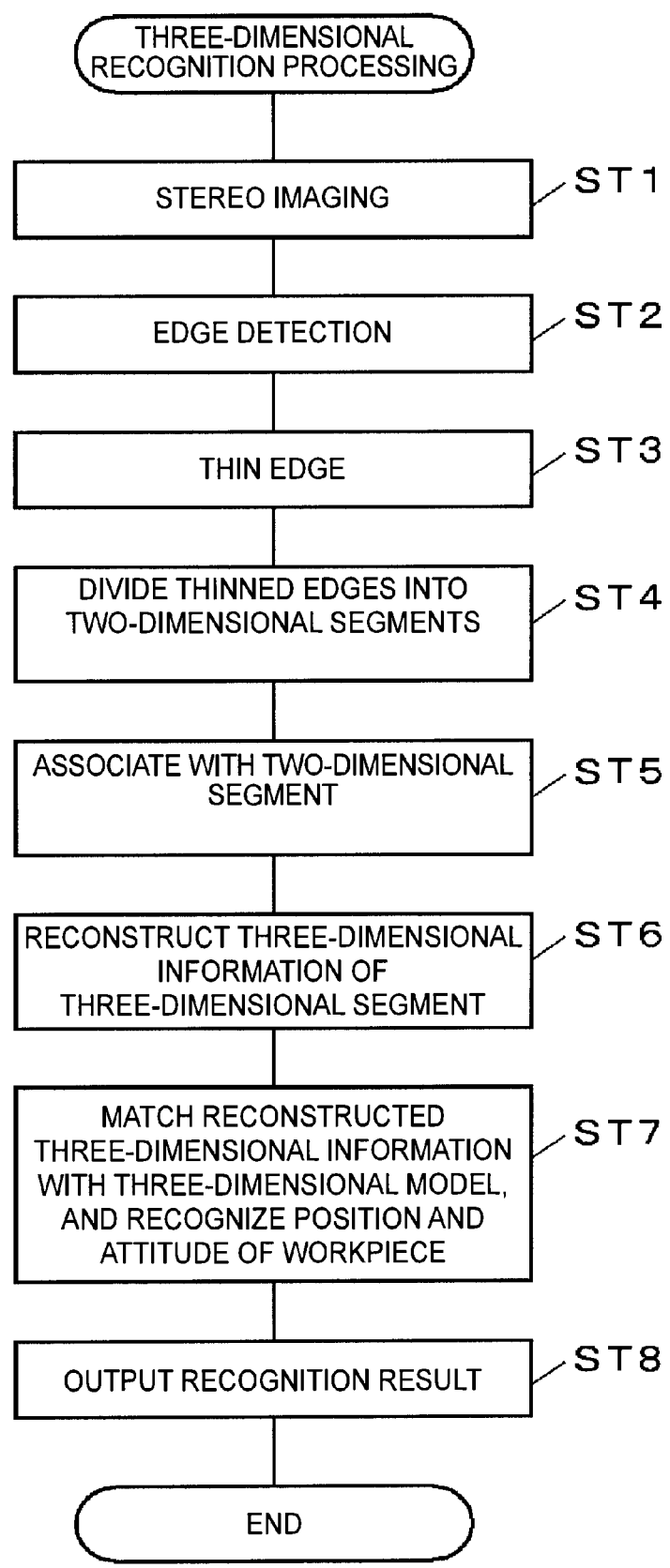
FIG. 3 is a flowchart showing a procedure of a three-dimensional recognition processing carried out by the above optical sensor.
Figure 4A:
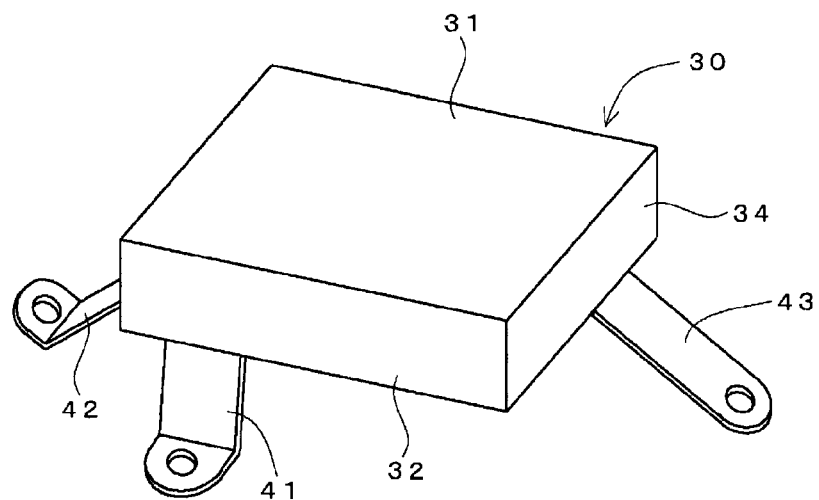
FIGS. 4A and 4B are a perspective view and a bottom view, respectively, showing a configuration example of a workpiece to be recognized.
Figure 4B:
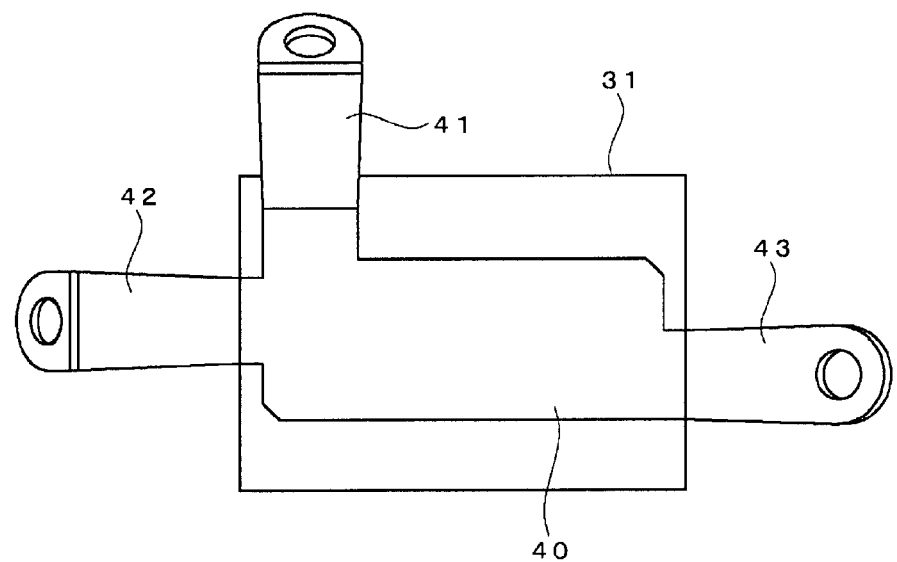
Figure 4C:
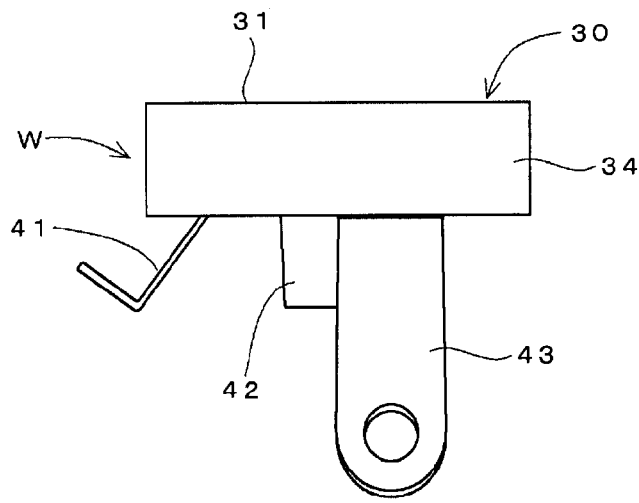
FIGS. 4C, 4D, and 4E are side views each showing a configuration example of a workpiece to be recognized.
Figure 4D:
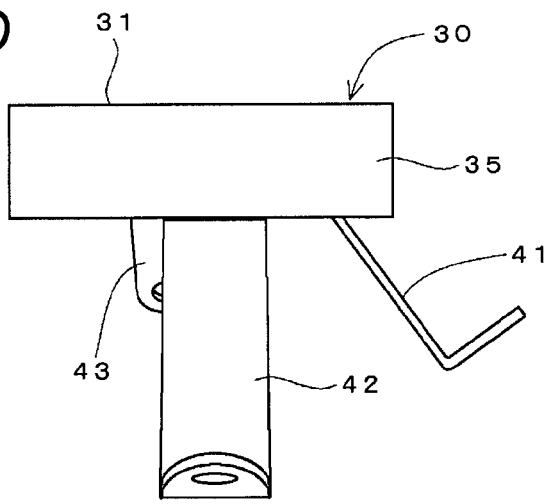
Figure 4E:
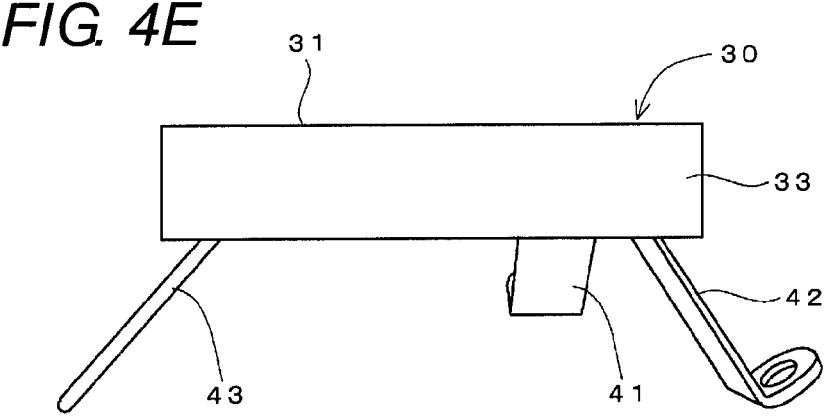

FIG. 3 shows processing procedure executed by the three-dimensional optical sensor 100 to recognize the workpiece W. The overview of recognition processing will be hereinafter described with reference to this flowchart.

First, the cameras A, B, C execute stereo-imaging (ST1), and extract edges from the generated images (ST2).

Subsequently, the detected edges are thinned (made into data having one pixel width). The thinned edges are divided into segments of lines and curved lines based on connection points and branching points (ST3, 4). These segments extracted from the edges on a two-dimensional image are hereinafter referred to as "two-dimensional segments".

Subsequently, processing is executed to associated two-dimensional segments related with each other over images (ST5). More specifically, one of the three images is adopted as a reference image, and attention is paid to two-dimensional segments of this reference image. A two-dimensional segment satisfying the following two conditions are searched from the remaining two images: One conditions is that the noted two-dimensional segment satisfies epipolar condition, and the other condition is that relationship with an adjacent segment matches with the noted two-dimensional segment. When the two-dimensional segment satisfying the conditions in the two images has been found as a result of this search processing, these are associated with the noted two-dimensional segment.

Two-dimensional segments that are not associated between the images are excluded from the following processing.

When the above associating processing is finished, the process proceeds to ST6, so that processing is executed to reconstruct three-dimensional information for each combination of the associated two-dimensional segments. A three-dimensional segment represented by this reconstructed three-dimensional information will be hereinafter referred to as a "three-dimensional segment".

Now, a process for reconstructing one three-dimensional segment from one set of two-dimensional segments associated with each other will be described.

First, two-dimensional segments associated with each other are further associated in units of pixels, and three-dimensional coordinates are calculated for each set of associated pixels. Further, a line or curved line approximating a distributed pattern of each three-dimensional image is set, and the set line or curved line is sampled at a predetermined interval. Then, a set of sampled three-dimensional coordinates associated with the attribute (line or curved line) according to the distributed pattern of each three-dimensional coordinate is determined as a three-dimensional segment.

In ST6, the above processing is executed with respect to all the combinations of the two-dimensional segments, thus reconstructing three-dimensional information constituted by a plurality of three-dimensional segments representing the outline shape of the workpiece W. When this processing is finished, the reconstructed three-dimensional information is matched with the model data previously registered in subsequent ST7, so that the position and the attitude of the workpiece W are recognized.

The processing of ST7 described above will be specifically described. In this embodiment, three-dimensional segments representing the outline shapes within the measurable range of workpiece W are registered as model data. In ST7, intersecting points of each three-dimensional segment are adopted as feature points, and each feature point on the model data side and each feature point in the reconstructed three-dimensional information are associated with each other in a round-robin manner, so that the degree of consistency between both of them is calculated. Then, an association in which the degree of consistency is more than a predetermined reference value is determined to be correct, and a coordinate associated with a representative point (for example barycenter) in the model data is determined to be the position of the workpiece W. Further, the rotational angle of the model data in this correct association is determined to be the attitude of the workpiece.

When the above matching processing finds a plurality of associations in which the degree of consistency with the three-dimensional model is more than the reference value, the coordinate and the rotational angle are determined for each association. Therefore, even where stereo measurement is carried out on a plurality of workpieces W, each of the workpieces W can be individually recognized.

When the position and the attitude of the workpiece W are recognized, the recognition result is thereafter outputted to the robot controller 3 via the communication interface 26 (ST8), and the processing is terminated.

In order to obtain a certain degree of accuracy in the above recognition processing, it is necessary to register highly accurate model data. In this regard, this embodiment is configured as follows. In a computer outside of the system shown in FIG. 1, CAD data of the workpiece W is converted into information in a three-dimensional segment format, so that three-dimensional information representing all of the outline shape of the workpiece W in actual dimension is generated. The generated three-dimensional information is adopted as basic model data (hereinafter referred to as a "basic model") of the workpiece. The generated basic model is saved into a compact disk and is provided to the user.

The user loads this compact disk into the external disk drive 27 of the recognition processing apparatus 2, and starts generation processing of a three-dimensional model. Then, the user arranges the actual model of the workpiece W in the same attitude as that in the actual measurement, and placing the actual model of the workpiece W in the measurement region of the stereo camera 1. Thereupon, the user uses the input unit 24 to give an instruction of imaging processing. The recognition processing apparatus 2 executes processing corresponding to steps ST1 to ST6 of FIG. 3 in accordance with this instruction, and matches the three-dimensional information of the reconstructed actual model with the basic model read from the external disk drive 27.

Further, in this embodiment, the attitude of the workpiece W is changed on every imaging within the range in which the workpiece W can be arranged during measurement, and the above-described stereo measurement and matching processing are performed for a plurality of cycles. Then, information in the three dimensional segments in the basic model side that is not associated with the stereo measurement result in any of the cycles of matching processing is determined to be unnecessary information for recognition processing. Then, the basic model from which the unnecessary information is deleted is registered to the memory 23 as model data used in the recognition processing of FIG. 3 (hereinafter referred to as a "practical model").

FIGS. 4A to 4E are a perspective view, a back view (FIGS. 4A and 4B, respectively), and side views seen form three sides (FIGS. 4C, 4D, and 4E, respectively) which illustrate a specific exemplary configuration of the workpiece W that is to be recognized by the optical sensor. As shown in these figures, the workpiece W according to this embodiment is a planar body 30 having a thickness, wherein the back surface of the planar body 30 is integrally arranged with an attachment metal 40 having three attachment pieces 41, 42, 43. The attachment pieces 41, 42, 43 protrude backward from three sides of the main body section of the attachment metal 40 in such a manner that the attachment pieces 41, 42, 43 are inclined with different angles. Further, leading edges of the attachment pieces 41, 42 are bent, whereas the attachment piece 43 is formed in a straightly extending shape. In FIGS. 4A to 4E, reference numerals 32, 33, 34, 35 denote the surfaces of thickness sections of the planar body 30.

The above workpiece W is placed such that an upper surface 31 of the planar body 30 faces upward, so that the planar body 30 is supported in the horizontal state by the attachment pieces 42, 43 (at this occasion, the attachment piece 41 is floating). Alternatively, as shown in FIG. 8 described below, the surface 33 may be bottom, so that the planar body 30 is supported in the vertical state.

Figure 5:
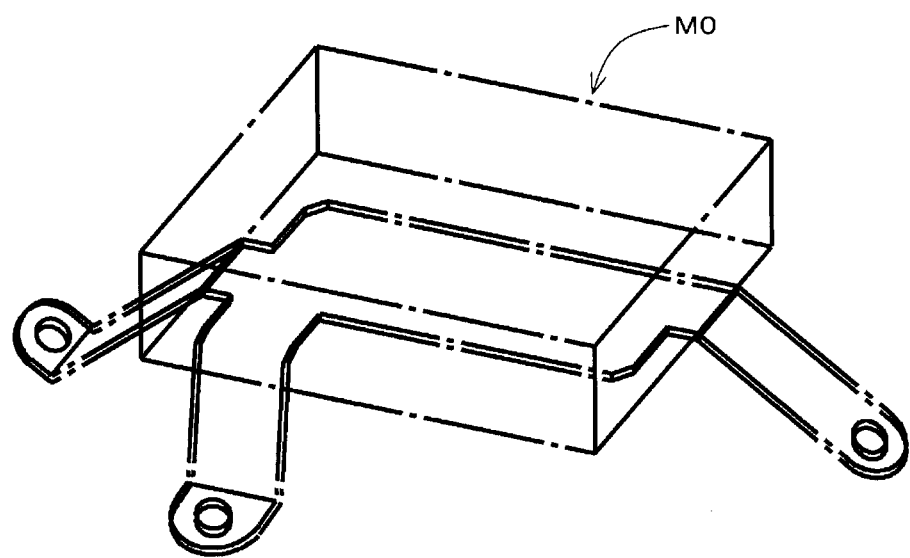
FIG. 5 is a view showing a data structure of a basic model of the workpiece shown in FIGS. 4A and 4B.

FIG. 5 is a schematic diagram according to the perspective view of FIG. 4 and illustrates a data structure of a basic model of the above workpiece W. This basic model M0 is generated by converting CAD data, and includes three-dimensional segment information (set of three-dimensional segments) representing all of the outlines of the workpiece W (indicated by alternate long and short dashed lines in the figure).

Figure 6:
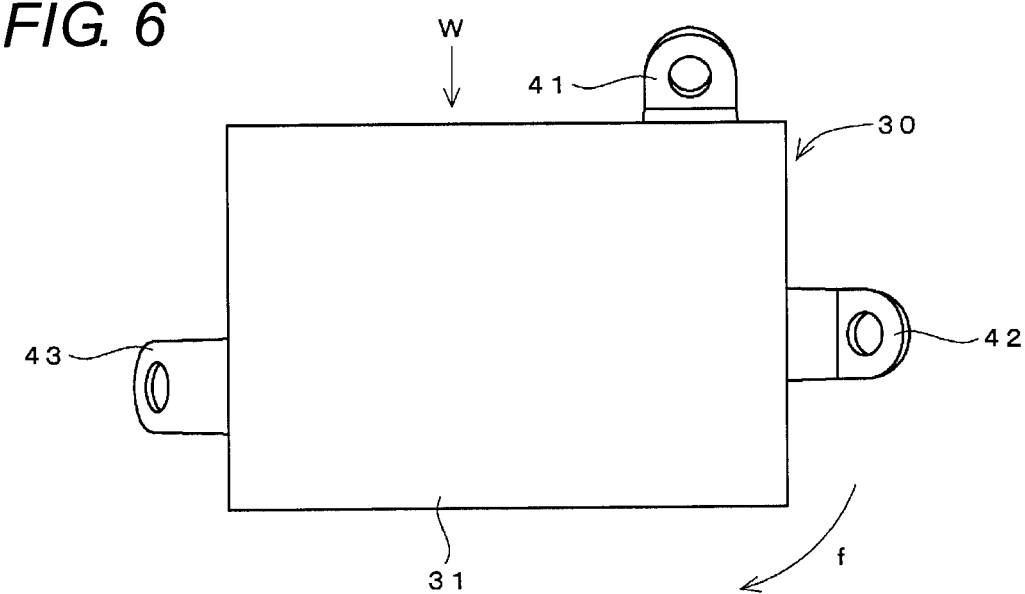
FIG. 6 is a view showing an arrangement example of a workpiece during measurement.

FIG. 6 is a view showing the actual model of the workpiece W (hereinafter simply referred to as the "workpiece W") arranged in the support state shown in FIG. 4, wherein the workpiece W of FIG. 6 is seen from a direction in which the stereo camera 1 measures the workpiece W. However, the attitude of the workpiece W with respect to the measurement direction is not constant, and there is a possibility that the workpiece W rotates in a direction of arrow f in the figure.

In the example of FIG. 6, measurement is carried out from immediately above the front surface 31 of the planar body 30. Therefore, the measurement can be performed only on the front surface 31 of the planar body 30 and near the leading edges of the attachment pieces 41, 42, 43. It is impossible to perform measurement on the back surface 32 of the planar body 30 and the main body section of the attachment metal 40.

Figure 7:
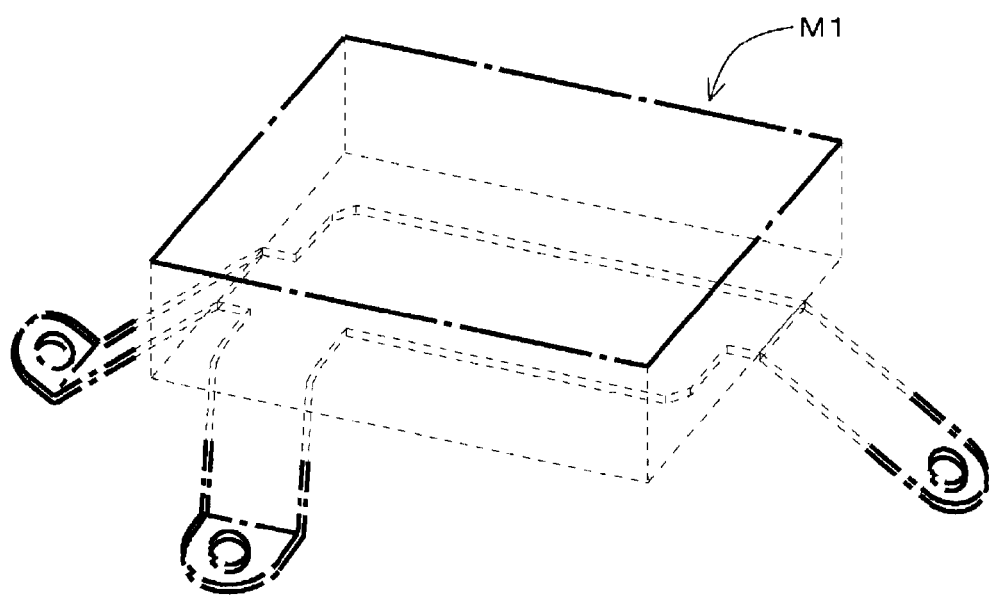
FIG. 7 is a view showing a data structure of a practical model generated using the workpiece in the arrangement of FIG. 6.
Figure 9:
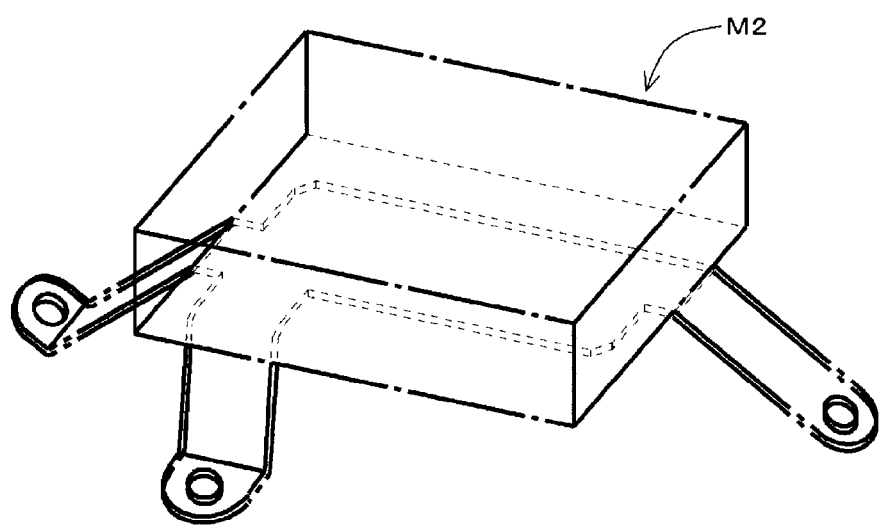
FIG. 9 is a view showing a data structure of a practical model generated using the workpiece in the arrangement of FIG. 8.

FIG. 7 shows an example of a practical model M1 generated by matching the measurement result obtained under the above measurement condition with the basic model M0 shown in FIG. 5. In FIG. 7 and FIG. 9 described later, deleted information is represented by an extremely thin broken line.

This practical model M1 is obtained by repeating imaging and measurement upon rotating the workpiece W in a direction of arrow f in FIG. 6 with respect to the measurement direction by a predetermined angle, matching the three-dimensional information obtained by each of the measurements with the basic model, and deleting information that is not associated with the three-dimensional information of the workpiece W from the basic model. As a result, the practical model M1 includes only information corresponding to actually-measured sections (the front surface of the planar body 30 and the leading edges of the attachment pieces 41, 42, 43).

Figure 8A:
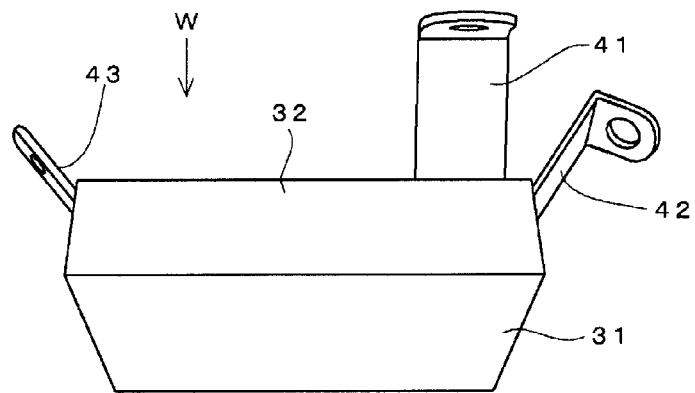
FIGS. 8A, 8B, and 8C are views each showing another example of an arrangement of a workpiece during measurement.
Figure 8B:
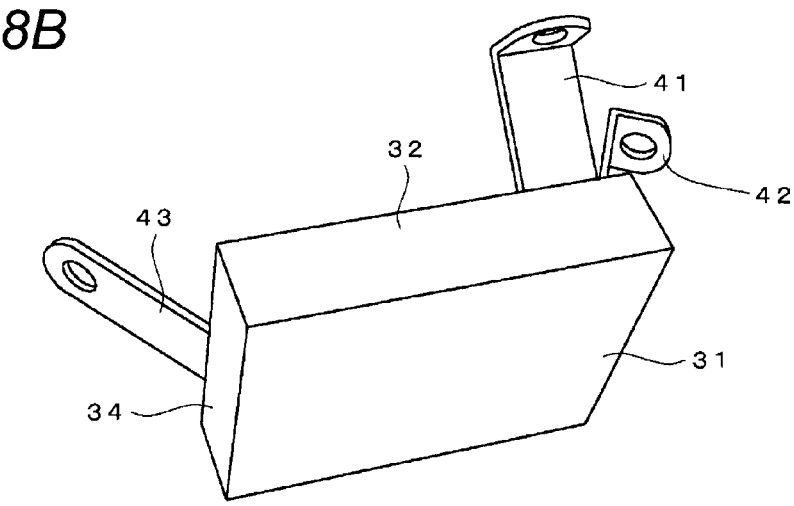
Figure 8C:
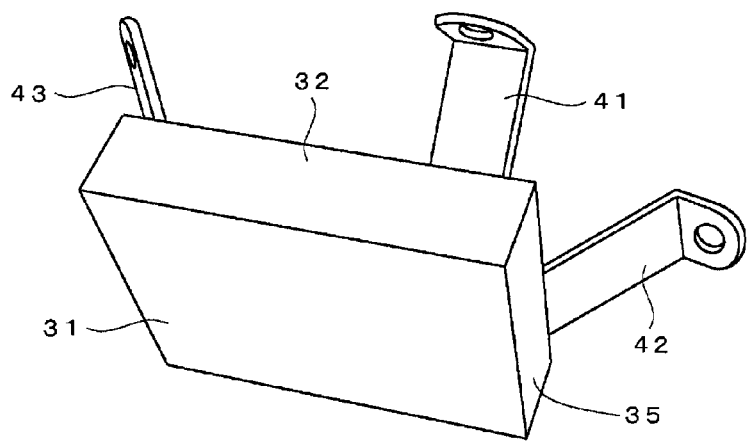

FIG. 8 is another arrangement example of the workpiece W with respect to the stereo camera 1. In the example, the workpiece W is arranged such that the surface 33 arranged in a direction without any attachment piece of the planar body 30 is used as a bottom section, so that the planar body 30 is vertically erect. FIGS. 8A to 8C show three possible attitudes in which the workpiece W can be arranged with respect to the measurement direction. In this way, the attitude of the workpiece W is not constant, but in this example, the back surface of the planar body 30 is not to be measured.

FIG. 9 shows an example of a practical model generated by executing multiple times of stereo measurement on the workpiece W arranged as shown in FIGS. 8A to 8C and matching the three-dimensional information obtained from each measurement with the basic model M0. This practical model M3 is generated by deleting the information that is not associated with the measurement result of the workpiece W from the basic model M0.

As shown in each of the above examples, the practical models MI, M2 generated by the optical sensor 100 according to this embodiment is obtained by deleting the information that could not be actually obtained in the measurement processing on the workpiece W from the three-dimensional information included in the basic model M0. Any of the practical models MI, M2 is generated so as to correspond to the measurement result of the workpiece W arranged in the same attitude as the attitude of the workpiece W actually recognized. Therefore, when the three-dimensional information obtained from the measurement processing is correctly associated with the practical model, almost all information about the practical model corresponds to the measured three-dimensional information in the recognition processing using the practical models MI, M2. As a result, the workpiece W can be recognized with a sufficient degree of consistency, and stable recognition processing can be achieved.

FIG. 10 shows a processing procedure when the practical model is generated.

This processing starts when the worker loads a compact disk storing the basic model into the external disk drive 27 and performs reading operation. First, in the first step (ST11), the basic model is read according to the reading operation, and the basic model is stored to a work area of the memory 23.

At this occasion, the worker arranges the workpiece W in the measurement region of the stereo camera 1 in the same attitude as that in the actual measurement, and performs imaging-instruction operation. According to this operation, ST12 attains "YES", and the stereo-imaging is executed (ST13). Further, the three-dimensional information of the workpiece W is obtained by performing the measurement processing using the stereo image generated by this imaging (ST14). ST14 of FIG. 10 represents the processing corresponding to ST3 to ST6 of FIG. 3. In ST14, a plurality of three-dimensional segments are obtained as the feature data representing the outline shape of the workpiece W.

In subsequent ST15, the three-dimensional information (feature data) obtained in the above measurement processing is matched with the basic model. In this case, the feature point obtained from the measurement and the feature point on the basic model side are associated with each other in a round-robin manner in the same manner as the processing of ST7 of FIG. 3, and processing for obtaining the degree of consistency is repeated, so that relationship therebetween with the highest degree of consistency is identified as correct relationship. In addition, another processing is also executed, so that the information that is not associated with the feature data in the above correct relationship is identified from among the three-dimensional information included in the basic model.

Thereafter, the worker varies the attitude of the workpiece W within the range expected in the actual measurement, and performs imaging-instruction operation. The optical sensor 100 executes each of the pieces of processing of ST13, 14, 15 according to this operation.

Likewise, stereo-imaging, measuring processing, and processing for matching the feature data obtained from the measurement processing with the basic model are thereafter repeatedly executed according to the imaging-instruction operation. When the worker decides that necessary imaging has been finished at a predetermined moment and performs terminating operation ("YES" in ST16), the information that is not associated with the measurement data in any of the matching processing is identified, based on each of the matching processing results, as unnecessary information from among the three-dimensional information in the basic model (ST17).

Thereafter, the unnecessary information identified is deleted from the basic model (ST18), and the remaining information is registered as a practical model to the memory 23 (ST19).

The practical model may be registered after the worker makes a confirmation operation. For example, the information from which the unnecessary information is deleted may be subjected to transparent transformation to be converted into the coordinate system of the cameras A, B, C, and an projected image generated by this transformation processing may be displayed on the display unit 25, so that the worker makes a decision whether the projected image displayed thereon is consistent with the image of the actual workpiece W.

According to the above procedure, the same basic model M0 is inputted to the plurality of optical sensors 100 which aim to process the workpiece W, and each of the optical sensors 100 can generate the practical model according to the measurement condition of each apparatus. For example, the basic model M0 having the configuration as shown in FIG. 5 is inputted to the optical sensor 100 that measures the workpiece W under the condition shown in FIG. 6 and the optical sensor 100 that measures the workpiece W under the condition shown in FIG. 8, and the processing of FIG. 10 described above is executed in each sensor 100, so that the former sensor 100 registers the practical model M1 as shown in FIG. 7 and the latter sensor 100 registers the practical model M2 as shown in FIG. 9. As a result, the processing for recognizing the workpiece W can be stably executed.

Even when the measurement condition of each optical sensor 100 is the same, and the measurable range varies depending on the difference of illumination state and camera characteristics, the same basic model may be inputted to each sensor 100, so that the practical model according to each measurement accuracy can be generated by the same method as that shown in FIG. 10.

Figure 11A:
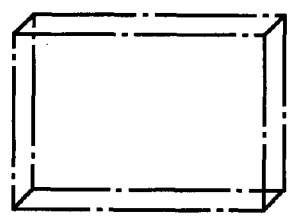
FIGS. 11A, 11B, 11C are views each showing an example in which a data structure of a practical model changes according to whether a shadow is cast on a workpiece.
Figure 11B:
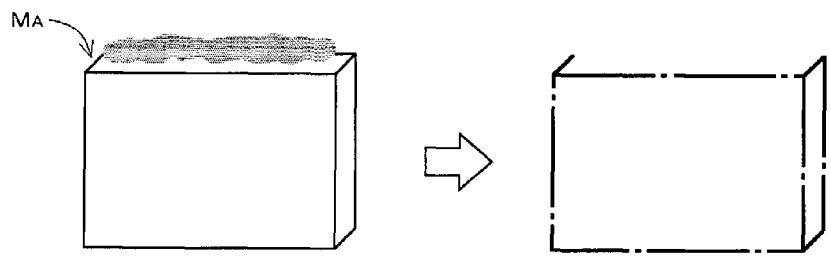
Figure 11C:
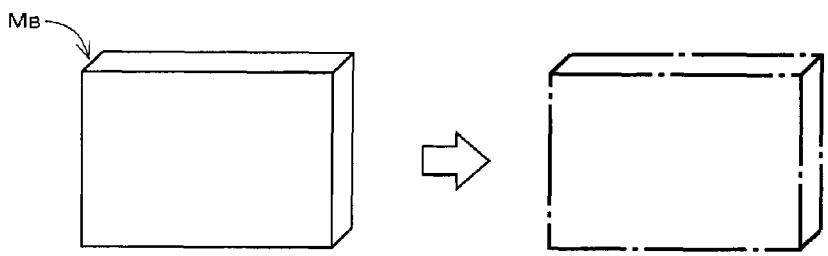

FIGS. 11A to 11C schematically show the workpiece W constituted by only the planar body 30 so as to illustrate the difference of the practical model due to the difference of illumination condition of the workpiece W. In this figure, FIG. 11A shows the basic model of the workpiece W. FIG. 11B shows the workpiece $W_A$ on which a shadow is cast. FIG. 11C shows the workpiece $W_B$ on which a shadow is not cast. The practical model $M_A$ and the practical model $M_B$ are also shown therewith.

In the above example, when the model registration processing is performed using the workpiece $W_B$ on which a shadow is not cast, the practical model $M_B$ includes information of all the outlines to be measured. In contrast, when the model registration processing is performed using the workpiece $W_A$ on which a shadow is cast, the practical model $M_B$ does not include information of the outlines on the surface on which the shadow is cast. As described above, the workpiece $W_A$ measured under the environment in which a shadow is cast is set with the practical model that does not include the information corresponding to the measurement data that cannot be obtained due to the shadow. Therefore, the recognition processing can be performed with a similar degree of accuracy to that for the workpiece $W_B$ measured under the environment in which a shadow is not cast.

When there is a factor, such as effect of external light, that changes the environment as the time passes, the workpiece W may be imaged and measured in each environment. In the matching processing with the basic model M0, information is deleted from the basic model M0 in a case where the number of times the information is be associated with the feature data of the workpiece W or a ratio of this number of times with respect to the total number of times of matching is more than a predetermined reference value, so that the practical model can be generated without any information about sections of which measurement is unstable. The same thing also applies to a case where there are not only sections of which measurement can be performed but also sections of which measurement cannot be performed.

When higher recognition accuracy is required, information may be deleted as being unnecessary information from the basic model in a case where the information cannot be associated with the measurement data in even one of the plurality of matching processing. With such stricter reference, the practical model can be generated that includes only the information about sections of which measurement can be stably performed, so that the recognition processing can be performed more stably.

In the above embodiment, the basic model is assumed to be generated from the CAD data, but the method for generating the basic model is not limited thereto. For example, an actual workpiece W may be placed in a measurement area of the optical sensor 100 in which preferable environment is ensured, and stereo measurement in a plurality of directions may be executed on the workpiece W. Thereupon, a basic model may be generated by a method for integrating the measurement results (see Japanese Patent No. 2961264), and the basic model may be imported to each of the optical sensors 100.

In the measurement processing in the above embodiment, the processing is carried out to reconstruct the three-dimensional information representing the outline shape of the workpiece W. Likewise, the basic model and the practical model are also constituted by the three-dimensional information representing the outline shape. The method of three-dimensional measurement is not limited thereto.

For example, a set of three-dimensional coordinates representing the shape of the surface of the workpiece W may be obtained by stereo measurement and light sectioning method, and this set may be matched with the registered model data. The three-dimensional coordinate group representing the entire surface shape of the workpiece W may be inputted as the basic model to the optical sensor performing the above measurement. Then, the imaging and measurement processing is executed on the actual workpiece W, and the three-dimensional coordinate group (feature data) obtained by the measurement processing is matched with the basic model. Thereupon, the basic model from which the coordinates that are not associated with the feature data of the workpiece W are deleted can be registered as the basic model.

Further, the above method for generating the practical model can be applied to not only the optical sensor for performing three-dimensional recognition processing but also an optical sensor for performing two-dimensional recognition processing. Hereinafter, processing for generating an edge pattern of a model to be registered will be described. In processing, one camera images the workpiece W, and the edge patterns in the generated image are matched with two-dimensional edge patterns of the registered model. In this processing, a type of optical sensor that recognizes the position and the attitude of the workpiece W will be described as an example.

The hardware configuration of the optical sensor according to this embodiment is the same as that shown in FIG. 2 except that there is only one combination of the cameras and the image input unit. In the below description, the reference numerals of FIG. 2 are used as necessary (the reference numerals of the camera are omitted).

In this embodiment, it is assumed that the optical axis of the camera is fixed to a particular direction (for example, the optical axis is directed to a vertical direction) and that the workpiece W to be processed is arranged such that the workpiece W is always supported by a particular section (for example, the arrangements shown in FIG. 6 or FIGS. 8A to 8C). In this case, the basic model represents, in actual dimension, the edge patterns of the workpiece W appearing in the image, and is generated by, for example, two-dimensional CAD data. Further, the optical sensor 100 according to this embodiment identifies, in advance, the magnification rate of the image generated by the camera (actual size of one pixel) based on a result of calibration processing, and registers this magnification rate to the memory 23.

Figure 12:
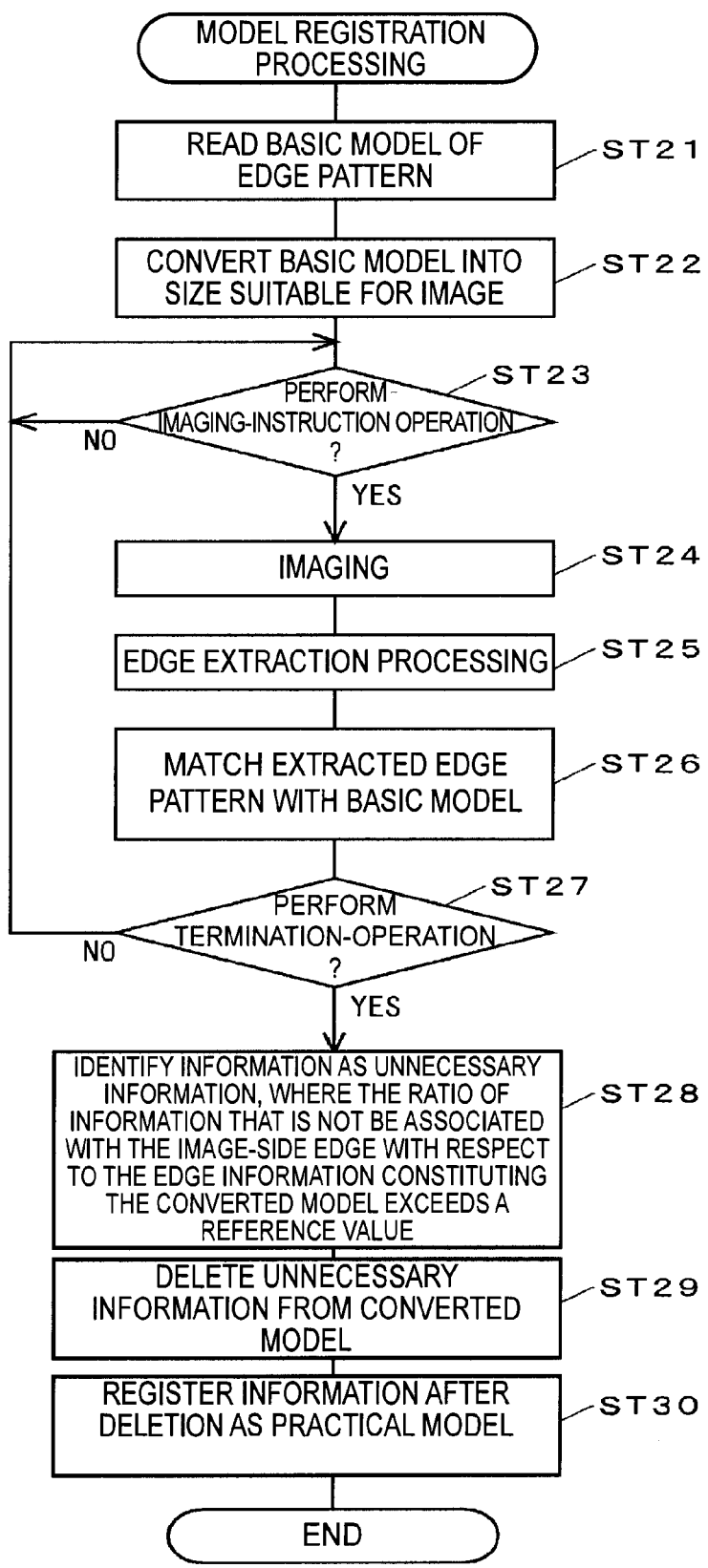
FIG. 12 is a flowchart showing a procedure of model registration processing performed by an optical sensor carrying out two-dimensional recognition processing.

FIG. 12 shows a procedure of processing for generating a practical model from a basic model that is performed by the optical sensor 100 configured based on the above assumption. In this processing, first, the basic model of the edge pattern are read from the compact disk (ST21), and this basic model is converted into a size suitable for the image based on the magnification rate registered in the memory 23 (ST22). The edge pattern having been subjected to this conversion will be hereinafter referred to as "converted model".

The user performs imaging-start instruction operation. Every time the user performs operation, the user changes the direction of the workpiece W with respect to the measurement direction within the expected range according to the conditions of the above assumption. Every time this operation is performed, the imaging processing of the camera, the processing for extracting edges from the generated image, and the processing for matching the extracted edge patterns with the converted model are executed (ST23 to ST26).

In the matching processing of ST26, the positional relationship between the edge patterns extracted from the image and the converted model is changed and is associated on every processing. When the degree of consistency becomes the largest, the relationship therebetween is identified as a correct relationship. Further, the information that is not associated with the edge to be matched is identified from the converted model in this correct relationship.

When a termination operation is performed at a predetermined time, the loop of ST23 to ST27 is terminated, and the process proceeds to ST28. In this ST28, for the purpose of deleting information of which measurement is unstable, information is identified as unnecessary information in a case where the ratio of information that is not associated with the image-side edge with respect to the edge information constituting the converted model exceeds a reference value. Then, this unnecessary information is deleted from the converted model (ST29), and the converted model from which the unnecessary information is deleted is registered as a practical model to the memory 23 (ST30).

As described above, when the recognition processing is performed using the feature data representing the two-dimensional shape of the workpiece W, the two-dimensional pattern representing the full-scale shape of the workpiece W within the range in which the camera can optically recognize the workpiece W is inputted as the basic model to the optical sensor 100. Then, the measurement result of the workpiece W arranged in the same attitude as that in the actual measurement is matched with the basic model, and the information that is less likely to correspond to the measurement result is deleted from the basic model. Therefore, the practical model without any unstable element such as variation of illumination can be generated. Further, the same basic model may be inputted to the plurality of optical sensors having the same setting content about the arrangement of the workpiece W and the optical direction of the camera, so that the practical models suitable for each of the sensors can be generated.

The basic model imported to the optical sensor 100 performing the above two-dimensional recognition processing is not limited to CAD data either. For example, with the optical sensor 100 installed in a preferable environment, the processing may be performed to image the workpiece W and extract edges form the generated image, so that model data represented in the magnification rate of this sensor is generated. Thereafter, the model data may be converted into information representing actual dimension based on the above magnification rate, and the thus converted model data may be adopted as basic model. Alternatively, a combination of the magnification rate and the model data generated with the optical sensor may be adopted as a basic model.

Further, when the same workpiece W is to be processed, but a different surface of the workpiece W is treated as the bottom surface depending on the optical sensor 100 (for example, there are the sensor arranged as shown in the example of FIG. 6 and the sensor arranged as shown in the example of FIG. 8), the three-dimensional information representing the entire outline shape of the surface of the workpiece W may be inputted as the basic model to each of the sensors, and the practical models are generated. In simple terms, in this case, the three-dimensional basic model is inputted to the optical sensor 100, and thereafter, the basic model is subjected to rotational correction according to the arrangement state of the workpiece W for the sensor 100. Further, the corrected basic model is subjected to transparent transformation to be converted into the camera coordinate system. Then, the two-dimensional edge pattern generated by this conversion is adopted as a converted model, and the processing of ST23 and subsequent steps in FIG. 12 are executed.

Lastly, the optical sensor 100 according to the above various configurations can execute the processing for recognizing the position and the attitude of the workpiece W to be recognized, and in addition, the optical sensor 100 can also be used for the purpose of determining whether or not the attitude or the shape of the workpiece W is appropriate based on the degree of consistency in matching of the measurement result with the model data. On the other hand, the optical sensor 100 adapted to extract and match two-dimensional edge patterns can recognize not only the position and the attitude of the workpiece W but also the height of the workpiece W by showing the model data registered according to the method of FIG. 12 in a plurality of magnification rates and matching the edge patterns extracted from the image of the workpiece W with the model data in various magnification rates.

What is claimed is:

1. A method for registering model data for optical recognition processing, wherein an optical sensor executes recognition processing of an object by imaging the object to be recognized with at least one camera, obtaining feature data representing a shape of the object by performing measurement processing using the generated image, and matching the obtained feature data with previously registered model data, and wherein the method for registering model data is a method for registering the model data used by the matching processing, the model data registration method comprising:

a first step for inputting, with regard to the object to be recognized, basic model data representing a full-scale shape of the object in an optically-recognizable range;

a second step for performing, for a predetermined number of cycles, with change to an attitude of the object in every cycle:

measurement processing and imaging processing performed with the at least one camera on an actual model of the object to be recognized; and processing for matching feature data of the actual model obtained by the measurement processing with the basic model data or two-dimensional edge pattern data converted from the basic model data using transparent transformation; and a third step for deleting data that could not be associated with the feature data of the actual model from the data being matched with the feature data of the actual model in the second step, after the second step has been performed for the predetermined number of cycles, and adopting the remaining data as model data to be registered.

2. The method for registering model data for optical recognition processing according to claim 1, wherein in the third step, the data that could not be associated with the feature data of the actual model in the matching processing in all of the cycles executed in the second step are determined to be deleted from among the data being matched with the feature data of the actual model.

3. The method for registering model data for optical recognition processing according to claim 1, wherein in the third step, the data that could not be associated with the feature data of the actual model for a number of times or ratio equal to or less than a predetermined reference value in the matching processing in the second step are determined to be deleted from among the data being matched with the feature data of the actual model.

4. The method for registering model data for optical recognition processing according to claim 1, wherein in the third step, information that could not be associated with the feature data of the actual model in the matching processing executed in the second step is determined to be deleted from among the data being matched with the feature data of the actual model.

5. The method for registering model data for optical recognition processing according to claim 1, wherein the measurement processing comprises three-dimensional measurement processing executed to obtain feature data representing a three-dimensional shape of the object to be recognized, and wherein in the first step, three-dimensional information representing the full-scale shape of the object that can be optically recognized is inputted as the basic model data, and in the matching processing in the second step, the feature data obtained from the actual model are being matched with the three-dimensional information represented by the basic model data.

6. The method for registering model data for optical recognition processing according to claim 1, wherein the measurement processing comprises processing for obtaining an edge in the image generated by the at least one camera, and wherein in the first step, two-dimensional information representing a full-scale edge pattern appearing in an image that is obtained by the at least one camera by imaging the object arranged in a particular attitude is inputted as the basic model data, and in the matching processing in the second step, the edge pattern obtained from the image of the actual model is being matched with an edge pattern represented by the basic model data.

7. An optical sensor for executing recognition processing of an object by imaging the object to be recognized with at least one camera, obtaining feature data representing a shape of the object by performing measurement processing using the generated image, and matching the obtained feature data with previously registered model data, and wherein the model data registration method is a method for registering the model data used by the matching processing, the optical sensor comprising:

an input unit for inputting, with regard to the object to be recognized, basic model data representing a full-scale shape of the object in an optically-recognizable range;

an actual model processing unit configured to perform, for a predetermined number of cycles, processing comprising, with change to an attitude of the object in every cycle:

measurement processing and imaging processing performed with the at least one camera under the condition that an actual model of the object to be recognized is subjected to processing;

processing for matching feature data of the actual model obtained by the measurement processing with the basic model data inputted from the input unit or two-dimensional edge pattern data converted from the basic model data using transparent transformation; and a model data setting unit configured to delete data that could not be associated with the feature data of the actual model from the data matched with the feature data of the actual model in the matching processing executed by the actual model processing unit after the measurement processing, imaging processing and the processing for matching have been performed for the predetermined number of cycles, and adopting the remaining data as model data to be registered.

8. The method for registering model data for optical recognition processing according to claim 2, wherein the measurement processing comprises three-dimensional measurement processing executed to obtain feature data representing a three-dimensional shape of the object to be recognized, and wherein in the first step, three-dimensional information representing the full-scale shape of the object that can be optically recognized is inputted as the basic model data, and in the matching processing in the second step, the feature data obtained from the actual model are being matched with the three-dimensional information represented by the basic model data.

9. The method for registering model data for optical recognition processing according to claim 2, wherein
the measurement processing comprises processing for obtaining an edge in the image generated by the at least one camera, and wherein
in the first step, two-dimensional information representing a full-scale edge pattern appearing in an image that is obtained by the at least one camera by imaging the object arranged in a particular attitude is inputted as the basic model data, and in the matching processing in the second step, the edge pattern obtained from the image of the actual model is being matched with an edge pattern represented by the basic model data.

10. The method for registering model data for optical recognition processing according to claim 3, wherein
the measurement processing comprises three-dimensional measurement processing executed to obtain feature data representing a three-dimensional shape of the object to be recognized, and wherein
in the first step, three-dimensional information representing the full-scale shape of the object that can be optically recognized is inputted as the basic model data, and in the matching processing in the second step, the feature data obtained from the actual model are being matched with the three-dimensional information represented by the basic model data.

11. The method for registering model data for optical recognition processing according to claim 3, wherein
the measurement processing comprises processing for obtaining an edge in the image generated by the at least one camera, and wherein
in the first step, two-dimensional information representing a full-scale edge pattern appearing in an image that is obtained by the at least one camera by imaging the object arranged in a particular attitude is inputted as the basic model data, and in the matching processing in the second step, the edge pattern obtained from the image of the actual model is being matched with an edge pattern represented by the basic model data.

12. The method for registering model data for optical recognition processing according to claim 4, wherein
the measurement processing comprises three-dimensional measurement processing executed to obtain feature data representing a three-dimensional shape of the object to be recognized, and wherein
in the first step, three-dimensional information representing the full-scale shape of the object that can be optically recognized is inputted as the basic model data, and in the matching processing in the second step, the feature data obtained from the actual model are being matched with the three-dimensional information represented by the basic model data.

13. The method for registering model data for optical recognition processing according to claim 4, wherein
the measurement processing comprises processing for obtaining an edge in the image generated by the at least one camera, and wherein
in the first step, two-dimensional information representing a full-scale edge pattern appearing in an image that is obtained by the at least one camera by imaging the object arranged in a particular attitude is inputted as the basic model data, and in the matching processing in the second step, the edge pattern obtained from the image of the actual model is being matched with an edge pattern represented by the basic model data.

* * * * *